(12) United States Patent
Petrzik

(10) Patent No.: US 7,300,375 B2
(45) Date of Patent: Nov. 27, 2007

(54) HYDRAULIC CIRCUIT FOR THE CONTROL OF A DRIVE TRAIN

(75) Inventor: Gunther Petrzik, St. Georgen (DE)

(73) Assignee: GETRAG Getriebe-und Zahnradfabrik Hermann Hagenmeyer GmbH & Cie KG, Untergruppernback (DE)

( * ) Notice: Subject to any disclaimer, the term of this patent is extended or adjusted under 35 U.S.C. 154(b) by 0 days.

(21) Appl. No.: 11/259,624

(22) Filed: Oct. 26, 2005

(65) Prior Publication Data

US 2006/0150762 A1    Jul. 13, 2006

Related U.S. Application Data

(63) Continuation of application No. PCT/EP2004/001727, filed on Feb. 21, 2004.

(30) Foreign Application Priority Data

Apr. 30, 2003    (DE) ................. 103 20 524

(51) Int. Cl.
    *F16H 31/00*    (2006.01)
(52) U.S. Cl. .............. 475/119; 475/120; 475/121
(58) Field of Classification Search .............. 475/116, 475/119, 120, 121; 74/335
    See application file for complete search history.

(56) References Cited

U.S. PATENT DOCUMENTS

| | | | |
|---|---|---|---|
| 3,760,918 A * | 9/1973 | Wetrich et al. | 192/87.11 |
| 4,903,727 A * | 2/1990 | Motzer | 137/596.16 |
| 4,903,729 A * | 2/1990 | Motzer | 137/596.16 |
| 6,199,441 B1 * | 3/2001 | Kanenobu et al. | 74/331 |
| 6,631,651 B2 | 10/2003 | Petrzik | |
| 6,909,955 B2 * | 6/2005 | Vukovich et al. | 701/51 |
| 2002/0119864 A1 * | 8/2002 | Harries | 477/79 |
| 2004/0074732 A1 * | 4/2004 | Busold et al. | 192/87.13 |

FOREIGN PATENT DOCUMENTS

| | | |
|---|---|---|
| DE | 100 20 187 A1 | 4/2000 |
| DE | 101 13 161 A1 | 3/2001 |
| DE | 101 34 115 A1 | 7/2001 |
| DE | 101 19 748 A1 | 10/2001 |
| DE | 101 49 527 A1 | 10/2001 |
| DE | 101 49 528 A1 | 10/2001 |
| EP | 802 355 A2 | 10/1997 |
| EP | 1 070 877 A2 | 1/2001 |
| EP | 1 150 040 A2 | 10/2001 |

OTHER PUBLICATIONS

International Preliminary Report on Patenability dated Mar. 2, 2006.

* cited by examiner

*Primary Examiner*—Ha D. Ho
(74) *Attorney, Agent, or Firm*—Knobbe Martens Olson & Bear LLP

(57) ABSTRACT

A hydraulic circuit for the control of a double clutch transmission which has two transmission groups, each with an isolating clutch and with a plurality of shift clutches for the engagement and disengagement of gear steps, the hydraulic circuit having for each transmission group a specific hydraulic branch connected to a pump in each case via a safety valve, and each hydraulic branch having in each case a clutch control valve for controlling the assigned isolating clutch and at least one shift control valve for controlling the assigned shift clutches. Here, the safety valves are designed in each case as proportional pressure regulating valves.

17 Claims, 5 Drawing Sheets

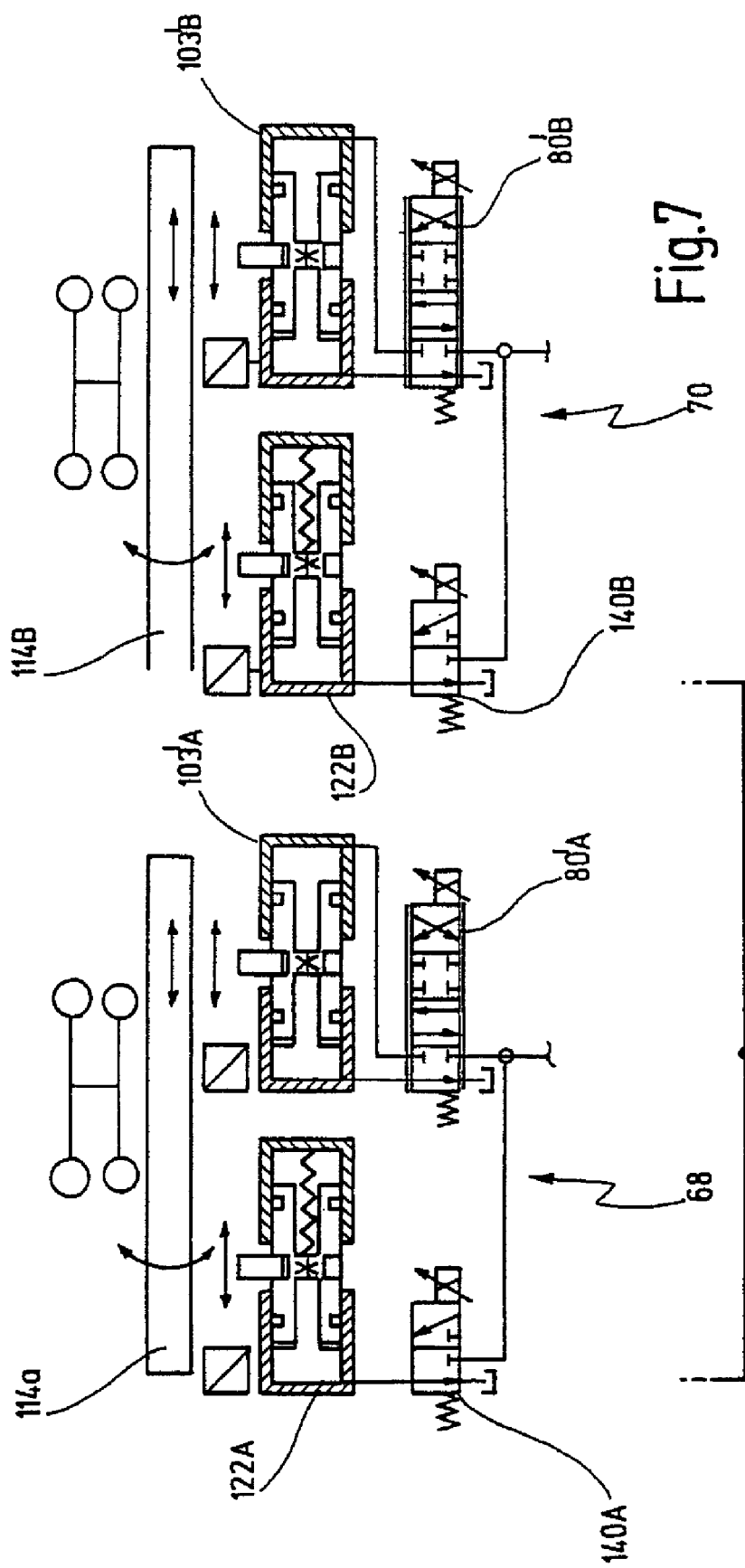

HYDRAULIC CIRCUIT FOR THE CONTROL OF A DRIVE TRAIN

CROSS-REFERENCE TO RELATED APPLICATIONS

This application is a continuation of PCT/EP2004/001727 filed on Feb. 21, 2004. The entire disclosure of this application is hereby incorporated by reference in its entirety.

BACKGROUND OF THE INVENTION

The present invention relates to a hydraulic circuit for the control of a drive train of a motor vehicle and relates particularly to a hydraulic circuit for the control of a double clutch transmission which has two transmission groups, each with an isolating clutch and with a plurality of shift clutches for engaging and disengaging of gear steps, the hydraulic circuit having for each transmission group a specific hydraulic branch connected to a pump in each case via a safety valve, and each hydraulic branch having in each case a clutch control valve for controlling the assigned isolating clutch and at least one shift control valve for controlling the assigned shift clutches.

Such a hydraulic circuit is known from DE 101 34 115 A1.

Double clutch transmissions have been known for a long time. Recently, however, there has again been greater interest in double clutch transmissions because the overlapping activation of the two clutches for a gear change free of interruption in traction can nowadays be mastered more easily in regulating terms. This applies particularly to those double clutch transmissions which use wet multiple-disk clutches as isolating clutches.

In general, double clutch transmissions offer a good compromise between a high degree of comfort and high efficiency. As mentioned, owing to the overlapping actuation of the two isolating clutches, it is possible for gears to be changed without any interruption in traction. This is generally not possible, for example, in conventional automated shift transmissions. On the other hand, double clutch transmissions afford a higher efficiency than, for example, classic converter-type automatic transmissions, since double clutch transmissions do not require an energy-consuming hydrodynamic converter.

A hydraulic circuit for the control of such a double clutch transmission is known from DE 101 34 115 A1 initially mentioned. In this case, the hydraulic circuit is divided into branches for the two transmission groups. Each branch has, on the input side, a pilot valve in the form of a nonproportional directional valve. The pilot valve possesses a safety-relevant function, since it makes it possible to "cut out" completely the transmission group which is not active in the respective case.

Each branch has a flow valve with fixed throttling for the control of a cylinder for actuating the assigned isolating clutch. Each transmission group has two shift rods for the actuation of assigned shift clutches. To actuate the shift rods, each hydraulic branch has a proportional pressure valve for each shift rod. The proportional pressure valves and the flow valve are connected to the outlet side of the directional safety valve.

Furthermore, a central directional valve device in the form of a multiplex value is provided between the proportional pressure valves and the four shift rods.

The known hydraulic circuit arrangement has various disadvantages. For example, the known hydraulic circuit has a comparatively large number of valves. The use of flow valves for controlling the isolating clutches causes a valve hysteresis difficult to control in regulating terms and high valve damping. Thus, it is possible, in general, for an oscillating oil column to excite a valve slide of such a valve, and therefore, as a rule, high damping has to be integrated. This leads to losses in dynamics.

Due to the use of one multiplex valve coupling the two hydraulic branches, if this valve fails, the entire double clutch transmission is inoperative.

In general, in hydraulic circuits for drive trains of motor vehicles, it is difficult for safety-relevant devices to be actuated hydraulically. This is because, on account of the high safety requirements, digital regulations, which can be parameterized and have high regulating quality, are usually ruled out.

Safety-relevant devices of a drive train are to be understood as meaning, for example, isolating clutches and shift clutches of an automated shift transmission and of a double clutch transmission, but also variator arrangements for continuously variable transmissions and toroidal transmissions.

SUMMARY OF THE INVENTION

The object of the present invention is, therefore, to specify an improved hydraulic circuit for the control of a drive train of a motor vehicle, and, in particular, an improved hydraulic circuit for the control of a double clutch transmission.

In the initially mentioned hydraulic circuit for the control of a double clutch transmission, the abovementioned object is achieved, according to one aspect of the invention, in that the safety valves are designed in each case as proportional pressure regulating valves.

A second control level can thereby be set up. The respective following valve arrangements of the respective branch can be simplified, and this also results in possibilities, easily controllable in safety terms, for optimizing the regulation of the isolating clutches or the shift clutches.

The above object is fully achieved in this way.

In the initially mentioned hydraulic circuit for the control of a double clutch transmission, the above object is achieved, according to a second aspect of the present invention, in that the two hydraulic branches are decoupled from one another in such a way that, in the event of a failure of any element of one transmission group or of one hydraulic branch, the vehicle remains drive-ready to a qualified extent by means of the other transmission group and the other hydraulic branch, respectively.

What can be achieved by the decoupling of the two hydraulic branches is that each transmission group can be operated as a specific transmission independently of the other transmission group. If one transmission group fails (for example, the transmission group for the even gears 2, 4, 6, etc.), the double clutch transmission can nevertheless be operated on the basis of the other transmission group by means of the hydraulic circuit according to the invention, in the example mentioned by using the gears 1, 3, 5, etc.

It is thus possible for the vehicle to remain drive-ready to a qualified extent, so that, for example, it can be driven to a garage or the like.

Furthermore, according to a third aspect of the present invention, the above object is achieved by means of a hydraulic circuit for the control of a drive train of a motor vehicle, with a proportional pressure regulating valve which can be connected on the inlet side to a pump, and with a digitally regulated proportional directional valve which is connected on the inlet side to the proportional pressure regulating valve and which can be connected on the outlet side to an actuator arrangement for the actuation of a safety-relevant device of the drive train.

By a pressure regulating valve and a following digitally regulated proportional directional valve being combined in series, two control levels for actuating the safety-relevant device can be implemented. The inlet-side proportional pressure regulating valve firstly serves for safety purposes and, in particular, is designed as a pressure limiting valve. By the pressure regulating valve being cut out, the safety-relevant device can be deactivated (as a rule, by means of a fail-safe arrangement).

In normal operation, the proportional pressure regulating valve is then preferably operated to saturation, so that essentially the nominal hydraulic pressure is available on the outlet side. By means of the digitally regulated proportional directional valve, a second, inner control level is set up. Owing to the increased safety of the proportional pressure regulating valve, the proportional directional valve can be regulated digitally.

The directional valve does not possess any pressure return of the working connection. For this reason, the directional valve cannot be excited into oscillations of the slide by an oscillating oil column. High damping can thus be dispensed with, and high dynamics are obtained. Furthermore, the digital regulation of the directional valve can take place in an essentially hysteresis-free manner. Finally, digital regulation allows parameterization, so that parameters of the digital controller can be set appropriately for different operating states, and therefore the regulating quality, overall, rises sharply.

Overall, therefore, the above object is fully achieved.

Particularly in the case of the first and the second aspect of the present invention relating to a hydraulic circuit for the control of a double clutch transmission, the following advantageous refinements are possible.

According to a preferred embodiment, the proportional pressure regulating valves are designed as pressure-limiting pressure regulating valves.

What is achieved thereby is that the hydraulic pressure in the respective hydraulic branch does not rise above a defined maximum value. Safety is thereby increased.

According to a further advantageous exemplary embodiment, at least one of the clutch control valves is designed as a proportional directional valve.

In contrast to pressure regulating valves, directional valves allow more dynamic and hysteresis-free regulation.

This applies particularly when the clutch control valves are regulated digitally. This is because parameterization of the regulating parameters is also thereby possible. Furthermore, it is possible to correct and learn the valve-specific properties. The regulating parameters can, for example, be set with reference to offset current, temperature, clutch wear, frictional conditions, pressure conditions.

In this case, it is particularly preferred if a sensor for a physical quantity assigned to the respective isolating clutch is provided, the output of which is sensed and fed to a digital controller.

The physical quantity may, in the case of the isolating clutch, be, in particular, the pressure.

Combining the proportional pressure regulating valve, as an inlet-side safety valve, with a digitally regulated directional valve results in two control levels. This initially makes it possible to utilize digital regulation in the motor vehicle. In many failures, the controllability of the respective hydraulic branch or of the transmission group is preserved, for example in the event of a failure of the digital pressure regulation.

Since the pressure regulating valve is preferably operated in such a way that, in nominal operation, the valve is fully open, no regulation-induced oscillations can occur in nominal operation, and there is therefore no need for high damping.

According to a further preferred embodiment, a pressure limiting valve is inserted in each case between the clutch control valves and actuators for actuating the isolating clutches.

The further pressure limiting valve increases operating safety even more.

In this case, it is particularly preferred if the pressure limiting valves preceding the actuators of the isolating clutches are coupled in such a way that a simultaneous frictional connection of the two isolating clutches is ruled out.

The safety of the hydraulic circuit is thereby increased even more. For example, coupling may take place in that the pressure limiting valves are designed as differential-pressure regulating valves, the connections of which are connected crosswise to one another.

Overall, it is preferred, furthermore, if at least one of the shift control valves is designed as a proportional directional valve.

In this case, too, the proportional directional valve can be regulated digitally, the control variable in the case of the shift clutches being, as a rule, the shift travel. In general, however, the same advantages arise as in a digital regulation of the proportional directional valve for the isolating clutch.

According to one embodiment of the invention, the gear steps of each transmission group can be shifted by means of at least two individual shift rods, the assigned hydraulic branch having for each shift rod at least one proportional directional valve as a shift control valve.

This embodiment allows an individual actuation of the respective shift clutches or shift clutch assemblies, that is to say the conventional combination of two shift clutches, by means of the individual shift rods. In this case, however, as a rule, a mechanical interlocking of the shift rods is required.

According to a first alternative embodiment, the gear steps of each transmission group can be shifted by means of a shift shaft, the assigned hydraulic branch having for each shift shaft at least one proportional directional valve as a shift control valve and having at least one selection actuator for selection movements of the shift shaft.

Such an arrangement may be designated as a double-H arrangement. Each transmission group is assigned only one shift shaft, and, as a rule, an axial movement of the shift shaft is used for shifting and a rotation of the shift shaft is used for selecting the respective shift clutch assemblies.

In this case, it is particularly advantageous that the selection actuator can be designed in an especially simple way. For example, the selection actuator may be a single-acting hydraulic cylinder which can be activated (nonproportionally) by means of a single directional valve. Alternatively, it is also possible to actuate the selection actuator magnetically or electromechanically or the like.

Preferably, each hydraulic branch has a selection control valve for the respective selection actuator.

This results in a strict separation between the two hydraulic branches.

Alternatively to this, a single common selection control valve for the selection actuators is provided for the two hydraulic branches.

This simplifies the outlay in terms of valves.

According to a further alternative embodiment, the gear steps of a transmission group can be actuated in each case by means of a shift drum.

In this embodiment, a shift drum is provided for each transmission group. The shift drum, too, can be actuated by means of a digitally regulated proportional directional valve, along with the advantages mentioned above.

Overall, it is advantageous, moreover, if, furthermore, a low-pressure circuit for cooling or lubrication is connected to the pump via a central valve.

By virtue of this measure, it is possible to connect the low-pressure circuit, too, to a central pump which also serves for supplying the high-pressure hydraulic branches.

In this case, it is particularly advantageous if the central valve is a proportional directional valve.

As a result, the pressure available for the low-pressure circuit can be adapted in a simple way to the other operating conditions. For example, the supply of the low-pressure circuit can be interrupted briefly when a high volumetric flow has to be available for clutch actuations.

Furthermore, it is advantageous if the central valve for the low-pressure circuit has a switching position in which the low-pressure circuit is connected to the pump via a diaphragm.

By virtue of this measure, in that switching position, a reduced volumetric flow can be permanently made available to the low-pressure circuit for lubrication or cooling. It is therefore appropriate to design this switching position as a fail-safe position.

Furthermore, it is advantageous if the low-pressure circuit has at least one jet pump.

Thus, even in the case of a comparatively low volumetric flow from the central valve, a high volumetric flow can be set up for cooling or lubrication.

It goes without saying that the features mentioned above and those yet to be explained below can be used not only in the combination specified in each case, but also in other combinations or alone, without departing from the scope of the present invention.

Exemplary embodiments of the invention are illustrated in the drawing and are explained in more detail in the following description.

BRIEF DESCRIPTION OF THE DRAWINGS

FIG. 7 shows a hydraulic circuit diagram of a further alternative arrangement for shift control; and FIG. 8 shows a modification of the arrangement of FIG. 7.

DETAILED DESCRIPTION OF PREFERRED EMBODIMENTS

Figure 1:
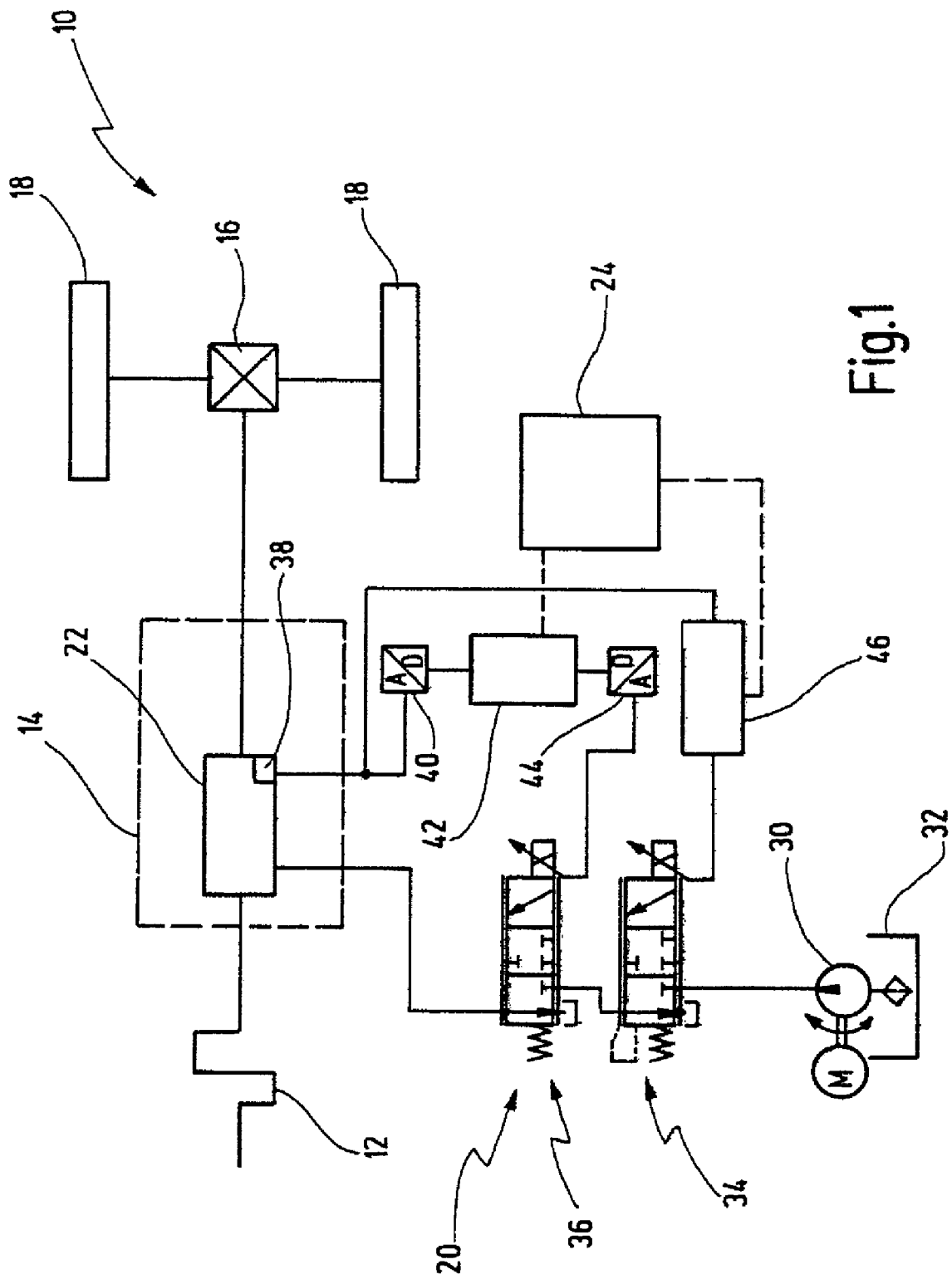
FIG. 1 shows a diagrammatic illustration of a first embodiment of a hydraulic circuit for the control of a drive train for a motor vehicle, according to the third aspect of the present invention.

FIG. 1 illustrates a drive train for a motor vehicle 10 in diagrammatic form.

The drive train has an internal combustion engine 12, a transmission 14, a differential 16 and driven wheels 18.

A hydraulic circuit 20 is provided for the control of the drive train, in particular of the transmission 14. Of the hydraulic circuit 20, only a detail is shown, which serves for controlling a safety-relevant device 22 of the transmission 14.

The safety-relevant device may be, for example, an isolating clutch or a shift clutch of an automated shift transmission or of a double clutch transmission. It may also be, however, a variator of a continuously variable transmission or a variator of a toroidal transmission or the like.

A safety-relevant device is to be understood, in the present context, as meaning any device of the transmission 14, the faulty actuation of which may be detrimental to the operating safety of the motor vehicle 10.

FIG. 1 shows, furthermore, a central control device 24 which controls the hydraulic circuit 20 and, if appropriate, further devices of the drive train and/or of the vehicle.

The hydraulic circuit 20 has a pump 30 which is motor-operated and is supplied from a tank 32.

A proportional pressure regulating valve is connected to the pump 30. The outlet of the proportional pressure regulating valve has connected to it a proportional directional valve 36 which is connected on the outlet side to an actuator of the safety-relevant device 22.

A physical quantity of the safety-relevant device 22, for example the pressure inside a multiple-disk clutch, the travel of a shift clutch or the like, is measured by means of a sensor 38.

The physical quantity determined by the sensor 38 is sensed by means of an analog/digital converter 40 and is fed to a digital controller 42. The digital controller may be a P-, a PI- or a PID-controller.

The output of the digital controller 42 is fed to a digital/analog converter 44, the output of which is connected to an electric or electromagnetic actuating device of the proportional directional valve 36.

The proportional directional valve is a 3/3-way directional valve with three connections and three switching positions. In the switching position illustrated, hydraulic energy is extracted from the safety-relevant device 22 and is fed to the tank 32.

By means of the digitally regulated proportional directional valve 36, the physical quantity of the safety-relevant device 22, which is measured by means of the sensor 38, can be regulated highly dynamically and accurately. This is because the directional valve 36 does not possess any pressure return of the working connection. The directional valve consequently cannot be excited into oscillations. Damping can be kept low, so that high dynamics are obtained. Furthermore, in this type of regulation, there is no valve hysteresis.

The proportional pressure regulating valve 34 forms, together with a conventional analog controller 46, an overriding control loop. The analog controller 46 is connected on the inlet side to the sensor 38 and on the outlet side to the electrical or electromagnetic actuating device of the valve 34.

In the event of a failure of the digital controller 42, if appropriate, the proportional directional valve 36 can be set to switch through, and, for this situation, the proportional regulating valve can assume the regulation of the safety-relevant device 22.

In normal operation, the proportional pressure regulating valve 34 is fully driven, so that the valve is fully open. In this normal state, therefore, the regulating function of the proportional pressure regulating valve 34 is cut out, so that no oscillations can occur.

The proportional pressure regulating valve 34 is designed as a single-step pressure limiting valve, in particular as a pressure reducing valve. The proportional pressure regulating valve 34 thereby forms, furthermore, a safety valve for limiting the physical quantity of the safety-relevant device 22 on which influence is exerted by means of the hydraulic circuit 20. Furthermore, the valve 34 has a cutout position, so that the downstream hydraulics can be shut off.

Overall, the hydraulic circuit 20 affords accurate and dynamic regulation of the physical quantity of the safety-relevant device 22, along with a high degree of safety. Digital regulation, such as is carried out on the proportional directional valve 36, is possible for the safety-relevant device 22 of the vehicle 10 basically only as the proportional pressure regulating valve 34 with a pressure limiting function precedes.

It goes without saying that the digital controller 42 may be implemented by means of software. It may also be integrated into the central control device 24.

The valves 34, 36 may also be connected directly to the central control device 24.

Figure 2:
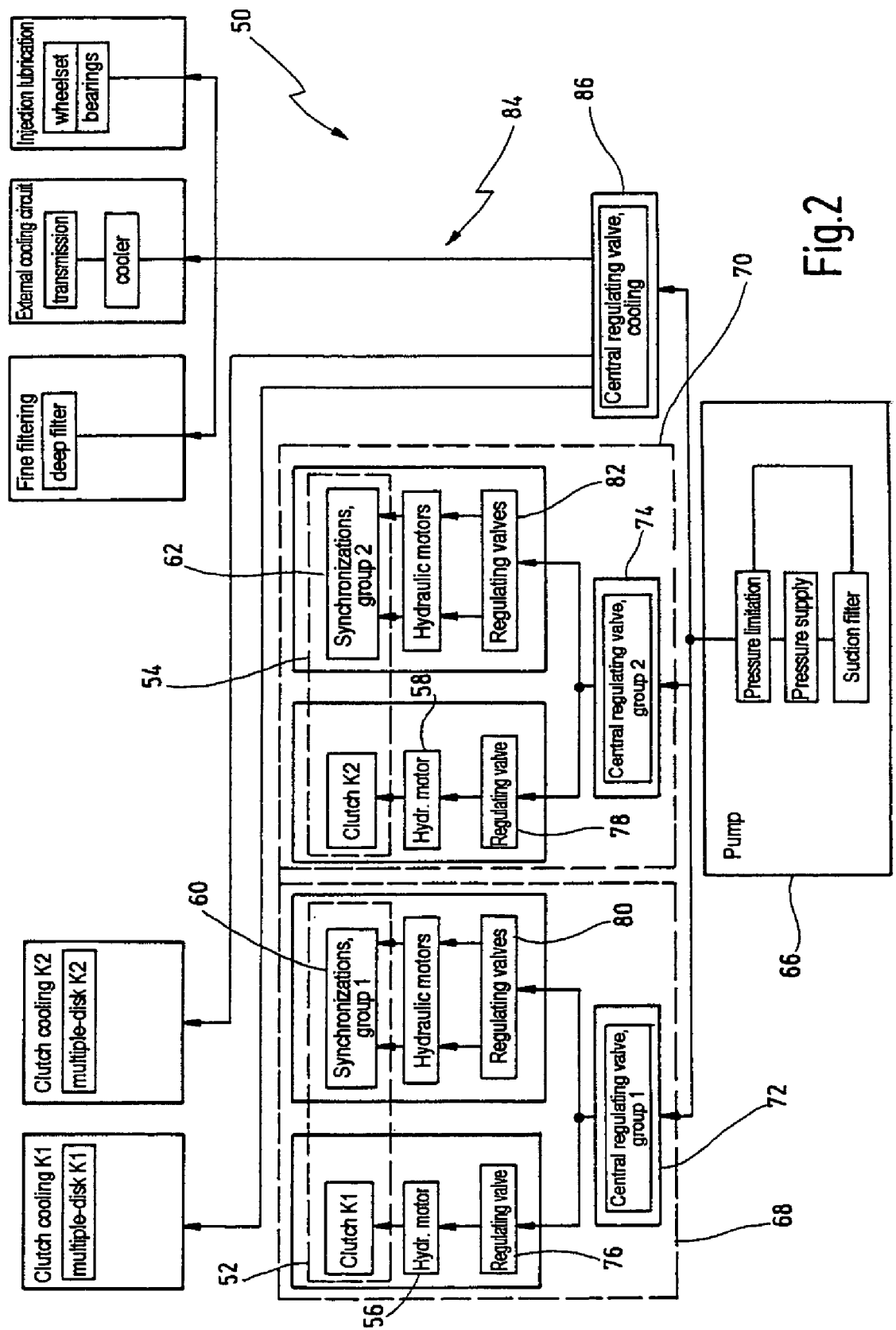
FIG. 2 shows a block diagram of a hydraulic circuit for a double clutch transmission according to the first and the second aspect of the present invention.

FIG. 2 shows, overall, a hydraulic circuit 50 for the control of a double clutch transmission according to the first and the second aspect of the present invention.

The double clutch transmission has a first transmission group 52 and a second transmission group 54.

The first transmission group 52 has a first isolating clutch K1 which is actuated by means of a hydraulic motor (clutch cylinder) 56. The second transmission group 54 has correspondingly a second isolating clutch K2 which is actuated by means of a hydraulic motor 58.

Furthermore, the first transmission group has shift clutches (in the present case, synchronizations) for the selection and deselection of gear steps of the transmission group 52, said shift clutches being designated diagrammatically by 60.

The second transmission group 54 correspondingly has shift clutches 62 for the selection and deselection of the gear steps of that transmission group.

The hydraulic circuit 50 has a pump 66 which in the conventional way contains a suction filter, a pressure supply and pressure limitation.

A first hydraulic branch 68 and a second hydraulic branch 70 are connected in parallel to the pump 66.

The first hydraulic branch 68 has a first safety valve 72 on the inlet side. The second hydraulic branch 70 correspondingly has a second safety valve 74 on the inlet side.

The safety valve 72 is connected on the outlet side to a clutch control valve 76 for activating the hydraulic motor 56. The second safety valve 74 is connected correspondingly on the outlet side to a clutch control valve 78 for activating the hydraulic motor 58.

Furthermore, the first hydraulic branch 68 has first shift control valves 80 which are connected to the outlet of the first safety valve 72. The second hydraulic branch 70 correspondingly has second shift control valves 82 which are connected to the outlet of the safety valve 74.

The shift control valves 80, 82 serve for activating the shift clutches 60, 62 of the first and of the second transmission group 52, 54 by means of hydraulic motors, not designated in any more detail.

Furthermore, the hydraulic circuit 50 has a low-pressure circuit 84 which is connected to the pump 66 via a central valve 86, in parallel with the first and the second hydraulic branch 68, 70.

The low-pressure circuit 84 serves, inter alia, for cooling the clutches K1, K2. Since the clutches K1, K2 are preferably wet multiple-disk clutches, and since the clutches K1, K2 are actuated under load during gear changes, a high cooling capacity during the gear changes is required.

Furthermore, the low-pressure circuit serves for cooling the transmission oil via a cooler and for the lubrication of wheel sets and bearings of the double clutch transmission. A fine filter for deep filtration is also connected to the low-pressure circuit.

It is advantageous, in the hydraulic circuit 50 of FIG. 2, that the two hydraulic branches 68, 70 are decoupled completely from one another. Consequently, in the event of a failure of a component of one transmission group 52, 54 or of the hydraulic branch 68, 70 assigned in each case, the other transmission group in each case can be operated unrestrictedly via the assigned hydraulic branch. Consequently, in the event of such a failure, the vehicle can be kept drive-ready to a qualified extent by means of the still functioning transmission group 52, in order, for example, to drive it to a garage or the like.

Furthermore, it can be seen that the hydraulic branches 68, 70 for the clutches K1, K2 and for the shift clutches 60, 62 operate in each case according to a regulation concept which is based on the regulation concept presented in FIG. 1. This applies particularly when the safety valves 72, 74 are designed as proportional pressure regulating valves, corresponding to the pressure regulating valve 34 of FIG. 1. Furthermore, the clutch control valves 76, 78 and/or the shift control valves 80, 82 may be designed as digitally regulated proportional directional valves, corresponding to the directional valve 36 of FIG. 1.

In this embodiment, the same advantages as described above with regard to FIG. 1 apply.

Figure 3:
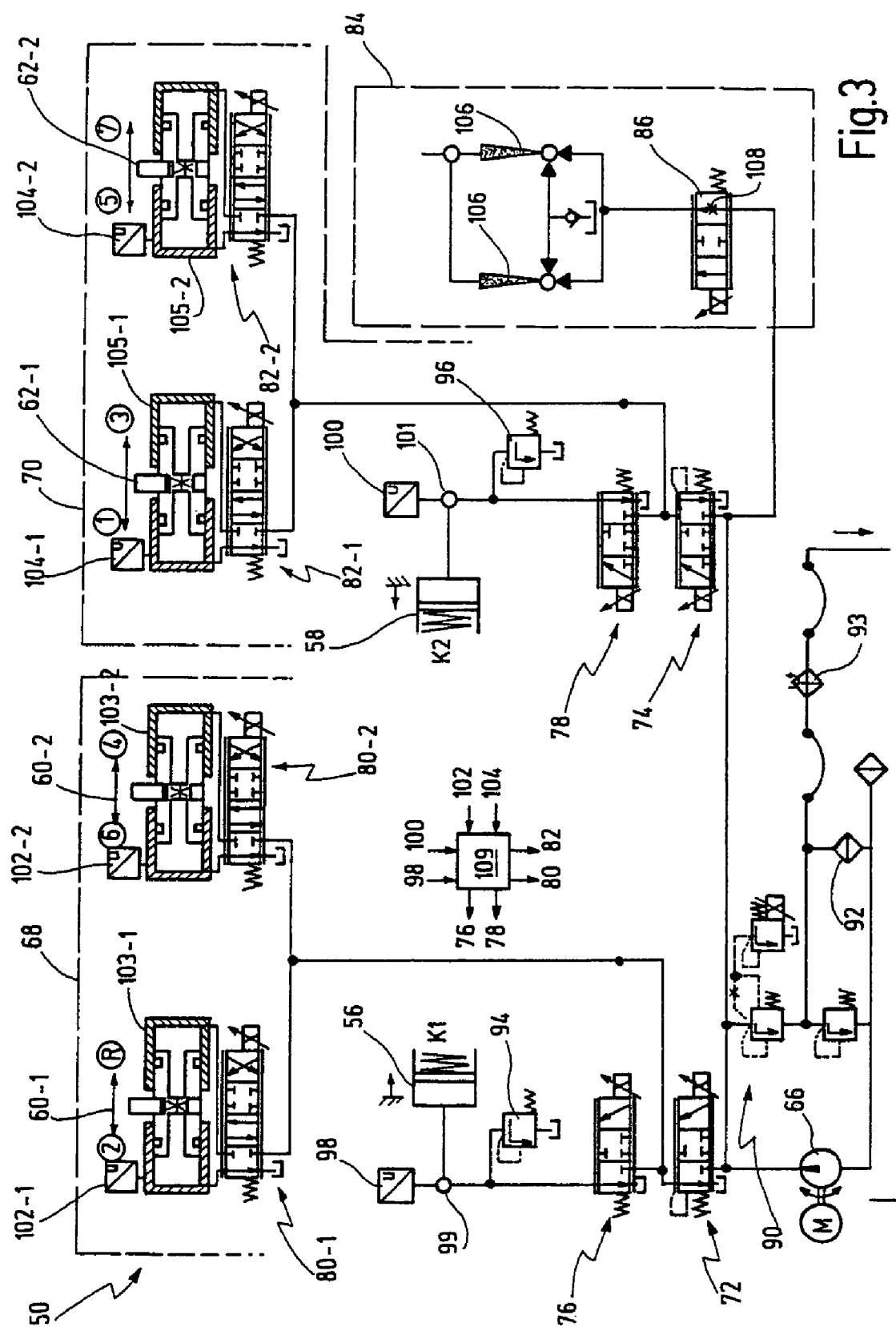
FIG. 3 shows a hydraulic circuit diagram of a hydraulic circuit according to the first and the second aspect of the present invention.

Such an implementation of the hydraulic circuit 50 is illustrated in FIG. 3. Identical elements are given the same reference numerals as in FIG. 2. The details which go further are therefore dealt with below.

Thus, the hydraulic circuit 50 of FIG. 3 has a network pressure regulating circuit 90 for regulating the hydraulic network pressure provided by the pump 66. The network pressure regulating circuit 90 has a two-step pressure limiting valve, not designated in any more detail, and a single-step pressure limiting valve, likewise not designated in any more detail, parallel to which a partial-flow filter 92 is connected. An external oil cooler is illustrated at 93.

To increase safety, a first pressure limiting valve 94 is connected to the outlet of the clutch control valve 76 in parallel with the clutch actuator 56. Correspondingly, a second pressure limiting valve 96 is connected to the outlet of the second clutch control valve 78, specifically in parallel with the second clutch actuator 58.

A digital pressure sensor 98 measures the internal pressure of the clutch K1 via a first rotary leadthrough 99. Correspondingly, a second digital pressure sensor 100 measures the internal pressure of the clutch K2 via a second rotary leadthrough 101.

The general setup for regulating the clutch pressure P of the clutches K1 and K2 corresponds essentially to the regulating circuit shown with regard to FIG. 1. In this case, the valve 76 (or 78) corresponds to the valve 36 and the valve 72 (or 74) corresponds to the valve 34.

The first transmission group 52 comprises two shift clutches 60-1 and 60-2 (for example, for selecting and deselecting the gear steps 2, 4, 6 and R).

A double-acting shift cylinder 103-1 is provided for actuating one shift clutch 60-1. A corresponding identically constructed double-acting shift cylinder 103-2 is provided for actuating the shift clutch 60-2. Double-acting shift cylinders 105-1 and 105-2 serve correspondingly for the actuation of shift clutches 62-1 and 62-2 of the second transmission group (for example, for selecting and deselecting gear steps 1, 3, 5 and, if appropriate, 7).

A digital displacement sensor 102-1, 102-2, 104-1, 104-2 is provided in each case on the shift cylinders 103, 105 in order to detect the travel of the shift clutches 60, 62.

A separate proportional directional valve 80-1, 80-2 and 82-1, 82-2 is provided in each case for activating the shift cylinders 102, 104. The directional valves 80-1 and 80-2 are connected in parallel to the outlet of the proportional pressure regulating valve 72 (first safety valve). The proportional directional valves 82-1, 82-2 are connected correspondingly in parallel to the outlet of the second safety valve 74.

The proportional directional valves 80, 82 are designed in each case as 4/4-way valves, so that switch points for actuating the respective shift clutches 60, 62 in both directions can be regulated.

The setup consisting of the first safety valve 72 and of each of the proportional directional valves 80, 82 otherwise corresponds to the regulation concept described with reference to FIG. 1. In this case, the valve 72 corresponds to the valve 34 and the valves 80-1, 80-2, 82-1 and 82-2 correspond in each case to the valve 36.

The physical quantity which is regulated in this case is the travel of the shift clutches 60, 62. The advantages described with regard to the regulating system of FIG. 1 apply correspondingly to the regulation of the shift clutches 60, 62.

The low-pressure circuit 84 according to FIG. 3 has a proportional directional valve 86 as a central valve.

The proportional directional valve 86 can control, for example, the pressure or the volumetric flow for the low-pressure circuit 84 proportionally, for example as a function of the engine rotational speed, the shift state, the temperature of the hydraulic oil, the introduction of heating to the transmission, etc.

As a rule, in this case, continuous adjustment serves for adapting the cooling oil flow to the available volumetric flow. In one switching position, the volumetric flow for cooling, available from the pump 66, is switched through. This is possible, since, at the time when cooling capacity is necessary in the clutches K1, K2, the clutches K1, K2 are at the slipping point at which essentially no travel adjustment of the respective actuator 56 or 58 takes place (that is to say, in other words, no volumetric flow is necessary for setting).

By contrast, during the shifting of the shift clutches 60, 62, a high volumetric flow is required, so that the directional valve 86 is changed over to shut-off, so that no cooling takes place. Since this is necessary in each case only very briefly, no impairment of the cooling and lubricating capacity is to be expected.

In a third position, a diaphragm 108 is provided in order to set up a basic cooling. This is at the same time the fail-safe position. This ensures that the drive train is sufficiently cooled and lubricated under all circumstances.

At the outlet of the proportional directional valve 86, an arrangement consisting of two jet pumps 106 is provided, in order to increase the volumetric flow required for the cooling of, in particular, the clutches K1, K2.

Shown centrally is a digital controller 109 which receives signals from the sensors 98-104 and supplies the valves 76-82 with actuating signals. The digital controller 109 corresponds to the digital controller 42 of FIG. 1. It is indicated merely diagrammatically in FIG. 3. It goes without saying that the digital controller 109 may be a component of a central control device, in a similar way to the control device 24 of FIG. 1.

The proportional valves 72, 74, 86 control the hydraulic power flow from the network to the consumers, specifically to the hydraulic branches 68, 70 and to the low-pressure branch 84. A first control level is thereby set up.

The second control level for controlling the actuators 56, 58, 103, 105 can be switched to be pressureless by means of the valves 72, 74, so that a high degree of safety is achieved.

The valves 72, 74 consequently form safety valves and, by virtue of their design, can be used as proportional pressure regulating valves, in particular pressure reducing valves with pressure limitation, in each case as central regulating valves. This applies particularly to the situation where digital regulation (digital controller 109) fails.

Since the pressure in the clutches K1 and K2 is measured internally, specifically via the rotary leadthroughs 99, 101, the regulating quality can be increased Modifications to the hydraulic circuit 50 which was described with reference to FIG. 3 are explained below.

What applies to all the modifications is that in each case only the differences from the hydraulic circuit 50 are described.

Figure 4:
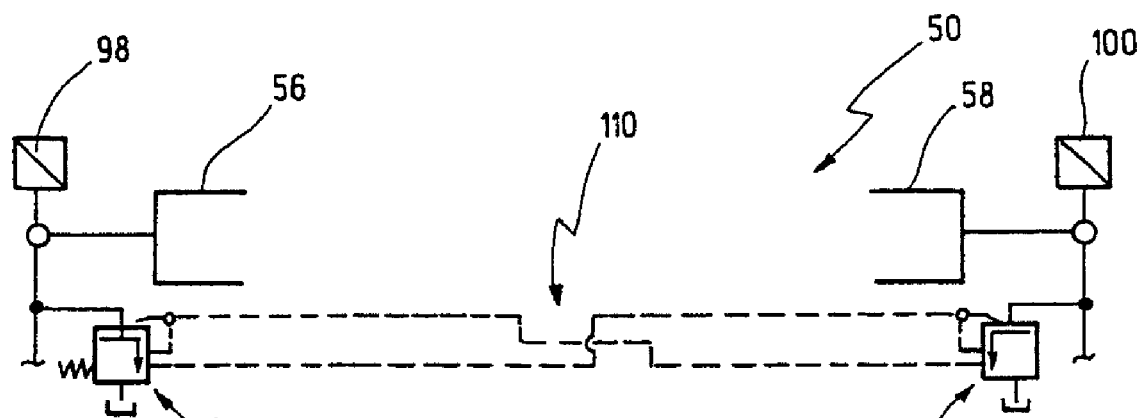
FIG. 4 shows a modification of the hydraulic circuit of FIG. 3.

Thus, FIG. 4 shows a modification in which, instead of the pressure limiting valves 94, 96, in each case differential-pressure regulating valves 94', 96' are provided, which are coupled crosswise to one another via a coupling 110.

What can be achieved thereby is that the two clutches K1 and K2 never come into frictional connection simultaneously. In other words, sum-pressure limitation thereby takes place, in order to avoid a transmission blockade.

Figure 5:
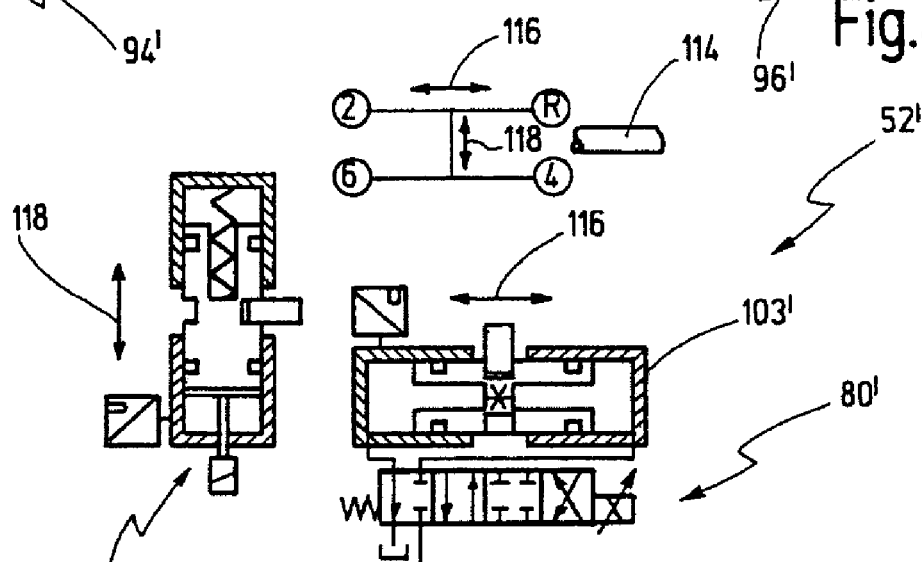
FIG. 5 shows a hydraulic circuit diagram of an alternative arrangement for shift control.

In the modification according to FIG. 5, instead of four individual shift rods for actuating the shift clutches (as a rule, shift clutch assemblies) 60, 62 for each transmission group, only one shift shaft 114 is provided. For example, in the transmission group 52' illustrated, an axial displacement of the shift shaft 114 in the direction 116 leads to shift operations, whereas a rotation of the shift shaft 114 in the direction 118 leads to the selection of the two shift gate slots.

Consequently, for shift operations, only a single digitally regulated proportional directional valve 80' (4/4-way directional valve) and only a single double-acting shift cylinder 103' are provided.

For selection movements, a single selection actuator 122 is provided, for example in the form of a single-acting hydraulic cylinder, as illustrated. Instead of the single-acting hydraulic cylinder, any other desired magnetic or electromechanical device may also be provided for the execution of the selection movements 118, for example a rotary magnet, an electric motor or the like.

Figure 6:
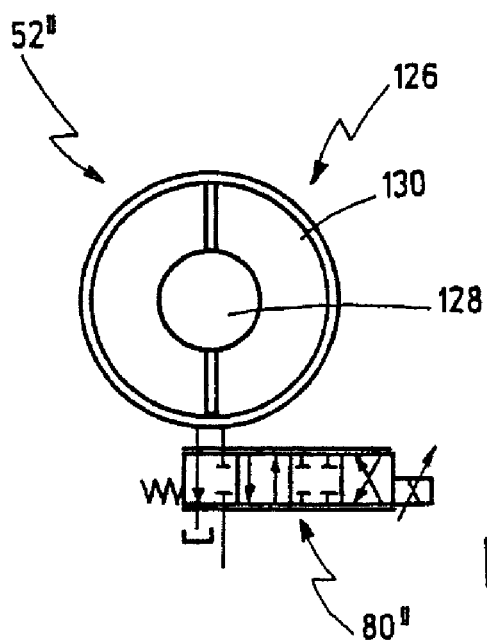
FIG. 6 shows a hydraulic circuit diagram of a further alternative arrangement for shift control.

FIG. 6 shows an arrangement in which the gears of a transmission group 52" are actuated by means of a single shift drum 126 which has a stator 128 and a rotor 130. A digitally regulated proportional directional valve 80" is provided once again for activating the shift drum 126.

FIG. 7 shows a further modification, in which, in a similar way to the arrangement of FIG. 5, a shift shaft 114A, 114B is provided for each transmission group.

A selection actuator in the form of a single-acting hydraulic cylinder 122A, 122B is provided in each case for the shift shafts 114A, 114B of the hydraulic branches 68, 70.

In each case a single 3/2-way directional valve 140A, 140B is provided for each of the hydraulic cylinders 122A, 122B. The directional valves 140A, 140B are illustrated as proportional directional valves and can be regulated in a similar way to what was explained initially with regard to FIG. 1. However, the directional valves 140A, 140B may also be single nonproportional directional valves.

FIG. 7 shows, furthermore, that the transmission group 52 which is assigned to the hydraulic branch 68 contains the gears 1, 3, 5 and R. The other transmission group 54 which is assigned to the hydraulic branch 70 has the gears 2, 4, 6 and also the reverse gear.

This arrangement can be implemented in a six-gear transmission. The particular feature is that the reverse gear R can be actuated by means of both hydraulic branches 68, 70. Redundancy is thereby further increased. In the event of a failure of one transmission group and/or of one hydraulic branch, the vehicle consequently remains drivable to a limited extent by means of the gears then available in each case (that is to say, 1, 3, 5 and R or 2, 4, 6 and R). This ensures, for this situation, that reverse gear, too, can always be actuated.

The fail-safe position set up in each case by means of the single-acting hydraulic cylinders 140A, 140B relates in each case to that gate slot in which two forward gears are available (that is to say, 3,5 or 4,6). Consequently, even in the event of a failure of the hydraulic cylinders 122A, 122B or of the assigned valves 140A, 140B, it is ensured that two forward gears can be shifted. The operating range of the transmission in the case of qualified drive readiness is thereby increased.

FIG. 8 shows a modification to the arrangement of FIG. 7. In the modification of FIG. 8, instead of the two selection control valves 140A, 140B, a single selection control valve 140' is provided, which is used for selection movements of both shift shafts 114A, 114B. The outlay in terms of valves is thereby reduced, although the strict separation of the two hydraulic branches 68, 70 is cancelled somewhat as a result. However, since the selection actuators 122A, 122B possess a reliable fail-safe position, this is less problematic.

What is claimed is:

1. A hydraulic circuit for the control of a double clutch transmission which has two transmission groups, each with an isolating clutch and with a plurality of shift clutches for the engagement and disengagement of gear steps, the hydraulic circuit having for each transmission group a specific hydraulic branch connected to a pump in each case via a safety valve, and each hydraulic branch having in each case a clutch control valve for controlling the assigned isolating clutch, wherein the safety valves are designed in each case as proportional pressure regulating valves, wherein the gear steps of each transmission group can be shifted by means of at least two individual shift rods, and wherein the assigned hydraulic branch has for each shift rod at least one proportional directional valve as a shift control valve for controlling the assigned shift clutches.

2. The hydraulic circuit as claimed in claim 1, wherein the proportional pressure regulating valves are designed as pressure-limiting pressure regulating valves.

3. The hydraulic circuit as claimed in claim 1, wherein at least one of the clutch control valves is designed as a proportional directional valve.

4. The hydraulic circuit as claimed in claim 1, wherein the clutch control valves are regulated digitally.

5. The hydraulic circuit as claimed in claim 4, wherein a sensor for a physical quantity assigned to the respective isolating clutch is provided, the output of which is sensed and is fed to a digital controller.

6. The hydraulic circuit as claimed in claim 1, wherein a pressure limiting valve is inserted in each case between the clutch control valves and actuators for actuating the isolating clutches.

7. The hydraulic circuit as claimed in claim 6, wherein the pressure limiting valves preceding the actuators of the isolating clutches are coupled in such a way that a simultaneous frictional connection of the two isolating clutches is ruled out.

8. The hydraulic circuit as claimed in claim 1, wherein at least one of the shift control valves is designed as a proportional directional valve.

9. A hydraulic circuit for the control of a double clutch transmission which has two transmission groups, each with an isolating clutch and with a plurality of shift clutches for the engagement and disengagement of gear steps, the hydraulic circuit having for each transmission group a specific hydraulic branch connected to a pump in each case via a safety valve, and each hydraulic branch having in each case a clutch control valve for controlling the assigned isolating clutch, wherein the safety valves are designed in each case as proportional pressure regulating valves, wherein the gear steps of each transmission group can be shifted by means of a shift shaft, and wherein the respective hydraulic branch has for the assigned shift shaft at least one proportional directional valve as a shift control valve for controlling the assigned shift clutches and has at least one selection actuator for selection movements of the shift shaft.

10. The hydraulic circuit as claimed in claim 9, wherein each hydraulic branch has a selection control valve for the respective selection actuator.

11. The hydraulic circuit as claimed in claim 9, wherein a single common selection control valve for the selection actuators is provided for the two hydraulic branches.

12. The hydraulic circuit as claimed in claim 1, wherein the gear steps of a transmission group can be actuated by means of a shift drum.

13. The hydraulic circuit as claimed in claim 1, wherein, furthermore, a low-pressure circuit for cooling or lubrication is connected to the pump via a central valve.

14. The hydraulic circuit as claimed in claim 13, wherein the central valve is a proportional directional valve.

15. The hydraulic circuit as claimed in claim 14, wherein the central valve for the low-pressure circuit has a switching position in which the low-pressure circuit is connected to the pump via a diaphragm.

16. The hydraulic circuit as claimed in claim 13, wherein the low-pressure circuit has at least one jet pump.

17. The hydraulic circuit as claimed in claim 1, wherein the two hydraulic branches are decoupled from one another in such a way that, in the event of a failure of any element of one transmission group or of one hydraulic branch of the hydraulic circuit, the vehicle remains drive-ready to a qualified extent by means of the other transmission group and the other hydraulic branch, respectively.

* * * * *